Oct. 28, 1941. V. D. POPOV 2,260,691
WEIGHING APPARATUS
Filed Oct. 6, 1937 3 Sheets-Sheet 1
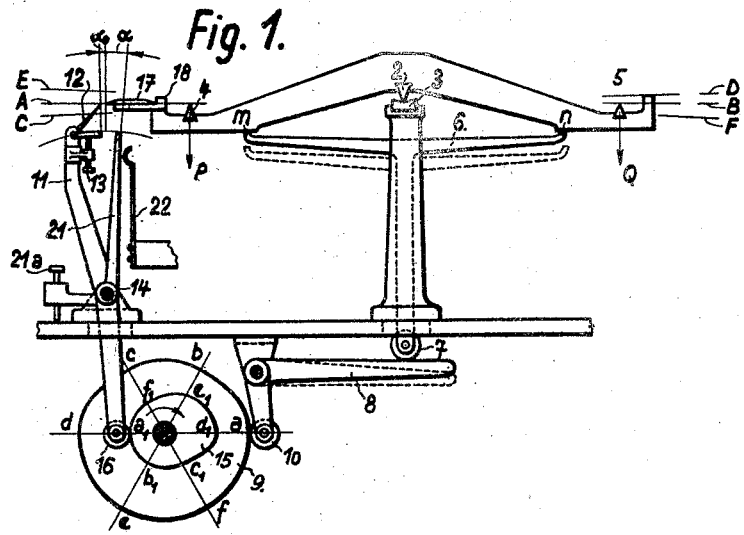
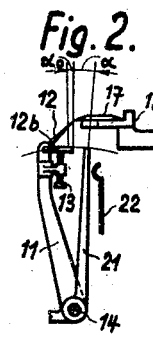 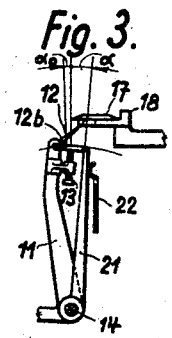 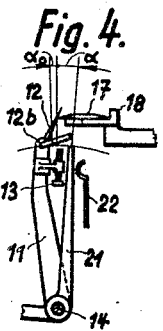 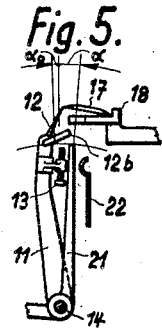
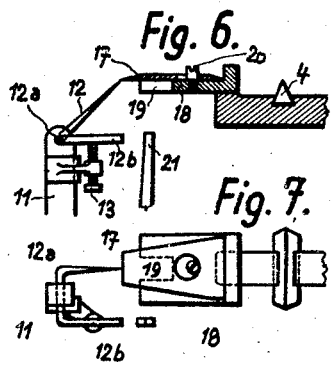 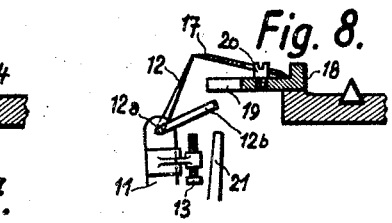
V. D. Popov
INVENTOR
By: Glascock Downing & Seebold
Attys.

Oct. 28, 1941.  V. D. POPOV  2,260,691
WEIGHING APPARATUS
Filed Oct. 6, 1937  3 Sheets-Sheet 2
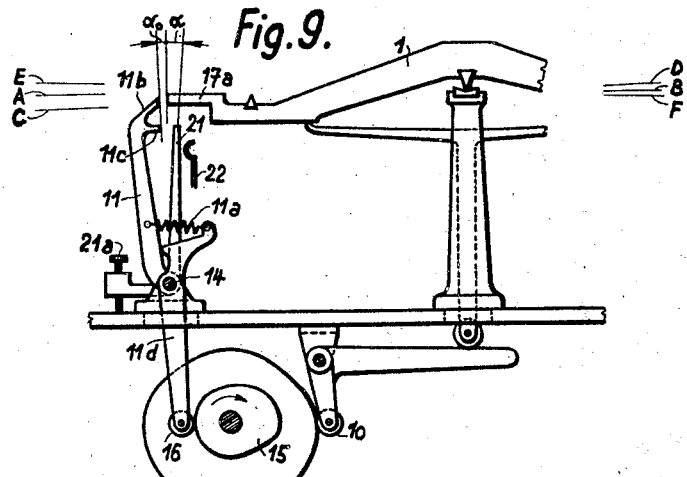
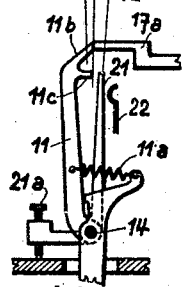 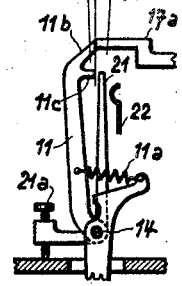 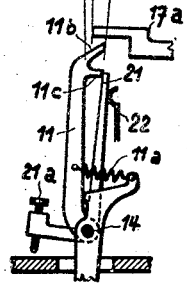
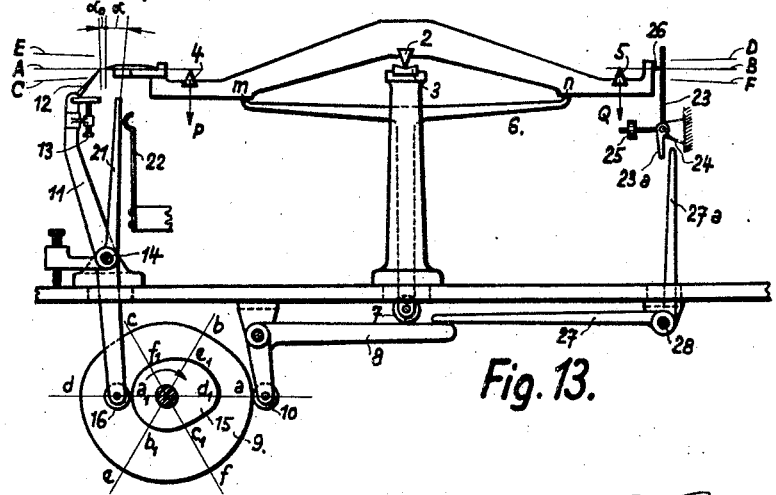
V. D. Popov
Inventor
By: Glascock Downing & Seebold
Attys.

Oct. 28, 1941. V. D. POPOV 2,260,691
WEIGHING APPARATUS
Filed Oct. 6, 1937 3 Sheets-Sheet 3

V. D. Popov
INVENTOR

By Glascock Downing & Seebold
Attys.

Patented Oct. 28, 1941

2,260,691

UNITED STATES PATENT OFFICE 2,260,691

WEIGHING APPARATUS

Vladimír Dimitrijevič Popov, Prague-Bubenec, Czechoslovakia

Application October 6, 1937, Serial No. 167,659
In Czechoslovakia December 2, 1936

5 Claims. (Cl. 249—1)

The scale beams adopted in automatic weighing machines hitherto known are for the purpose of determining whether the weight of a given article, or of a given quantity of a material, is greater or less than a pre-determined theoretical value, in order to enable a further operation to be effected in accordance with such determination. Thus for example the scale beams in machines for weighing out materials determine the weight of material upon the scale pan, and if the weight of material thereon is less than a pre-determined value, a further supply of material enters the scale pan, whereas in the event of there being a sufficient weight of material upon the pan this quantity is transferred for packing. Apparatus of this nature is disclosed in U. S. Patent Number 2,198,788. In machines for sorting articles according to their weight the scale beams have the same function as in these weighing out machines, that is to say, of distributing the articles in accordance with any desired theoretical limit of weight, which may be determined in grams for example, into light and heavy articles.

For the correct sorting of articles into light and heavy articles it is very important that the scale beams should be of the utmost possible sensitiveness, and that this sensitiveness should in fact be utilised in weighing. The adoption of scale beams of the utmost sensitiveness, in known machines, does not however guarantee accurate working thereof, because the scale beams in automatic weighing are exposed to unfavourable conditions, which distort the normal working thereof, and prevent the weighing from being effected within the limits of sensitiveness of the scale beam. In some machines, for example, the scale beams are subjected during the weighing to the influence of individual accessory members, which, during the time when material is being supplied for weighing, have a braking effect on the action thereof, the deflection of the scale beam being utilised for carrying out operations which render it necessary that the deflection should be large and powerful. Finally in some machines the scale beams move upon an endless track or the like, which in itself precludes the employment of sensitive scale beams. In these cases, however, a mechanical impulse cannot be ensured in deflections within the limits of the sensitiveness of the scale beam.

Similar circumstances preclude the possibility of weighing upon scales, particularly automatic scales, with a maximum exactitude, that is to say, within the limits of very small weights, by which the sensitiveness of a scale beam is characterised. It should be mentioned that a scale beam in the position of equilibrium has no kinetic energy, and, that a very small loading of the scale beam, in the neighbourhood of the sensitiveness of the scale beam, yields a greatly retarded, small and hardly appreciable deflection, which cannot do any mechanical work, or even close the contact of an electric circuit, whereas in all automatic weighing apparatus, if the same are to work accurately, even with small deflections, in dependence upon the result of the weighing, an impulse must be given for the purpose of carrying out a mechanical operation; thus for example, for the purpose of delivering or not delivering material, or for the purpose of displacing the article in the direction of the light or heavy groups and so forth.

This invention consists in apparatus for automatic weighing by the aid of a scale beam, which, however, in its work, is not exposed to any influence from subsidiary members, though in dependence upon the direction of deflection of the scale beam a mechanical impulse is obtained for producing a working effect upon the article. According to the present invention any deflections, even those that are hardly perceptible, can be ascertained, and are completely sufficient, after the termination of the weighing, in dependence upon the result thereof, to give a mechanical impulse, by means of an auxiliary source of energy, for the purpose of carrying out a further mechanical operation without any co-operation of the scale beam.

The apparatus according to this invention is based upon the mutual action of a part on the scale beam and a special feeling member, which only comes into operation after the weighing has been effected or after any deflection of the scale beam.

It may be observed that the co-operation of the scale beam and feeler is secured by a supplementary arresting device, which always ensures the correct direction of deflection of the scale beam. As will be gathered from the ensuing description, the essence of the invention consists in the feature that by the said feeler work is performed upon an article when the scale beam deflects in a direction which precludes a meeting of the scale beam with the feeler, that is to say, the performance of work upon the article is obtained without any kinematic or dynamic co-operation of the scale beam. Upon the scale beam deflecting in a direction in which the scale beam meets with the feeler, this feeler changes its position, in order to keep the scale beam free from prejudicial influences, from the operative position into an inoperative position, and does not do any work. What has been adduced permits such conditions of the action of the scale beam to be fulfilled as are present in hand weighing a scale beam of any desired sensitiveness, and enables manipulations to be carried out upon the article without the co-operation of the scale beam, independently of the direction in which the scale beam has deflected owing to the influence of the weight of the article.

Some embodiments of weighing apparatus according to the present invention are diagrammatically illustrated by way of example in the accompanying drawings, in which:

Figure 1 is a diagrammatic view in elevation of apparatus for carrying out the invention;

Figures 2, 3, 4 and 5 are similar views of part of the apparatus, showing various possible positions of the scale beam after the expiration of the time allowed for weighing;

Figure 6 is a view in sectional elevation of a modification of part of the apparatus shown in Figures 2 to 5 on a larger scale;

Figure 7 is a plan view of the part shown in Figure 6;

Figure 8 is a view similar to Figure 6 but with the parts in a different position;

Figures 9, 10, 11 and 12 are views in sectional elevation showing a modified form of construction;

Figure 13 shows diagrammatically in sectional elevation a secondary arresting device;

Figure 15:
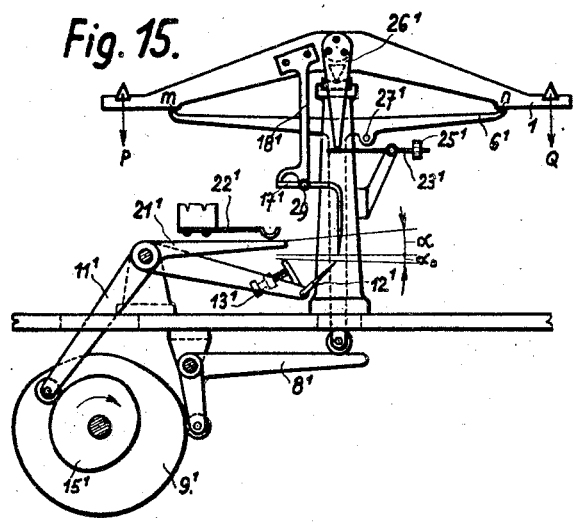
Figures 15 to 19 are various views showing a further modified form of construction.

Figure 1 shows ordinary weighing apparatus with a two-armed scale beam 1, which swings upon the knife edge of a triangular knife 2 on bearing 3. At the ends of the scale beam 1 there are triangular knife edges 4 and 5, through the medium of which loads P and Q to be compared act upon the scale beam 1. The scale beam 1 may be held at the points $m$ and $n$ by means of any known arresting device, acting in the direction of movement of the scale beam and forming for instance a fork 6, which is supported by means of a roller 7 upon one arm of a lever 8, which can be deflected into the position indicated in dotted lines in Figure 1 by the co-operation of a cam disc 9 with a roller 10. The lever 8 executes such a deflection when the cam disc 9 revolves in the direction indicated by an arrow, when the point $b$ of the cam disc comes into contact with the roller 10. The roller 7, and with it the fork 6, then sink into the position indicated in dotted lines in Figure 1, and remain in this position during the further rotation of the cam disc 9, until the point $c$ thereon comes into contact with the roller 10. In the lower position of the arresting fork 6 the scale beam 1 is completely released, and can oscillate under the influence of the loads P and Q. The time during which the part from $b$ to $c$ of the periphery of the cam disc 9 is passing the roller 10 is therefore devoted to the weighing. During the further rotation of the cam disc 9 through an angle corresponding to the part $c$ to $d$ the lever 8 rocks back into the original position and arrests the scale beam 1 for a period during which the cam disc 9 rotates from $d$ through $e$ and $f$ to $a$. Hence the scale beam, from the point $d$ to the point $a$ of the cam disc 9, is arrested, and during this time, by means of a known device, the load P or Q can be removed and replaced by a fresh one, or some other work can be carried out in dependence upon the purpose for which the weighing machine is employed.

The scale beam may for instance be sensitive to a loading of 0.01 gram, and from this load upwards is capable of deflecting from the position A B into the position C D or E F within the time during which the cam disc 9 passes with its arc $b$—$c$ over the roller 10. This period is hereinafter referred to as the weighing time. In order to determine this deflection upwards or downwards, and to give a corresponding impulse for carrying out or not carrying out a definite operation by means of an auxiliary source of energy, there is employed according to the invention a feeler, consisting for example of a member 12 (Figure 7) bent into the shape of a hook with one sharp end and one blunt end, mounted on the end of a lever 11, as diagrammatically indicated in Figures 1 to 8 and 13. This hook, which will hereinafter be referred to as the feeler, can rotate freely in the lever 11 in a counterclockwise direction according to the embodiment illustrated about a pivot 12$a$ (Figures 6, 7 and 8), while rotation thereof in a clockwise direction is prevented by an abutment or screw 13, upon which the blunt horizontal end 12$b$ of the feeler 12 rests by its own weight. The lever 11 swings upon a pivot 14 by the aid of a cam disc 15 (Figure 1) revolving at the same time as the disc 9 about the same axis, and of a roller 16. Within the time during which the segment $a$—$b$—$c$ of the cam disc 9 is moving past the roller 10, a segment $a_1$—$b_1$—$c_1$ of the cam disc 15 moves past the roller 16, and the lever 11 is deflected through an angle $a_0$, so that in the position corresponding to the point $c_1$ on the cam disc 15 the lever 11, with its feeler 12, touches a part arranged rockably on the end of the scale beam. In the example shown the said part is formed by a blade-like contact member 17 (Figures 2, 6 and 7), which bears freely upon a small table 18 secured to the end of the scale beam 1 and provided with a notch 19. The part 17 bears with one knife edge against the edge of the table 18, and projects with its other knife edge beyond the margin of this table. Although the correct position of the plate 17 upon the table 18 is ensured by its own weight, it may be secured, for greater protection against possible alterations, by means of the head of a screw 20 secured upon the table 18, this head passing through an aperture of ample width in the part 17, as shown in Figures 6, 7 and 8. In the event of the scale beam 1, in consequence of a difference between the loads Q and P amounting to 0.01 gram or more, moving out of the position AB into the position EF when released, the aforementioned contact of the feeler 12 with the edge of the part 17 does not take place, and since the lever 11, owing to the influence of the cam surface $c_1$—$d_1$ on the cam disc deflects further through an angle $\alpha$, the feeler 12 passes undisturbed through the notch 19 in the table 18 underneath the part 17, as shown in Figure 3. In the event of the scale beam 1, in consequence of the difference between P and Q being equal to or greater than 0.01 gram, being deflected to the left into the position C D, the feeler 12, upon the lever 11 being deflected through the angle $a_0+\alpha$, engages the edge of the part 17, and is rotated in a counter clockwise direction relative to the lever 11, as shown in Figure 4. If actual contact of the point of the feeler 12 with the edge of the part 17 occurs, which is only possible when the scale beam 1 is at rest in its position A B, that is, for instance, when P—Q is less than 0.01 gram, the feeler 12, upon deflection of the lever 11 through the angle $\alpha_0+\alpha$, rotates in a counter clockwise direction, and can also raise the part 17, as shown in Figures 5 and 8. The position of the feeler 12 corresponding to Figures 5 and 8 is very improbable, since during the raising of the part 17 the equilibrium at the point of contact is disturbed, and the part 17, in relation to the feeler 12, assumes one of the positions represented in Figures 3 and 4.

From the above description it will be gathered that the lever 11 has a positive movement, and takes the feeler 12 with it towards the scale beam, so that if the part 17 were to be rigidly connected with the scale beam 1, the feeler 12, in the event of direct contact with the part 17, would have to bear against the part, and either a raising of the scale beam out of its bearing 3 might occur, or the feeler would have to be resilient, which will be hereinafter further considered. On this ground a movability of the part 17 is necessary in order to prevent a similar phenomenon, and in order that in the event of contact of the feeler 12 with the part 17 the part may react and not the scale beam, and may alter its position represented in Figures 2, 3 and 4 into a position according to Figure 5.

It is obvious from Figure 3 that, for instance, with a load P less than Q, the feeler 12 deflects freely through the entire angle $\alpha_0+\alpha$ without meeting the part 17 and bears with its blunt end 12b against the lever 21. This lever 21 serves as release organ, whose movement may be utilized for operating a known mechanism which carries out certain manipulations with the article on the scale, for instance, it removes said article and puts a fresh one in its place, or it carries out other manipulations which are dependent on the purpose for which the scale beam is intended. It is also possible to utilize the movement of the lever or release organ 21, for instance, through the medium of a contact spring 22 for switching on an electric current of any known device (not shown) which carries out the corresponding manipulations with the article. The lever or the release organ 21 normally assumes the position shown in Figure 1; this position is determined, for instance, by a regulating screw 21a (Fig. 1) arranged on the left arm of the lever 21. The said regulating screw 21a prevents a deflection of the lever 21 to the left while a deflection to the right is effected by the blunt end 12b of the feeler 12 bearing against the said lever so that this lever is moved to the right (Fig. 3) and comes in contact with the contact spring 22 which, as stated above, is adapted to switch on an electromagnetic device. When the feeler 12 meets the part 17, as shown in Fig. 4, the end of the feeler 12b moves upward whereby it does not meet the lever or release organ 21, that is to say the release organ 21 is not actuated so that the corresponding mechanism is not set in operation which occurs with a load P greater than Q (Fig. 1) or with a load P less than Q according to Figure 15.

As regards the case illustrated in Figure 5, the arm 12b likewise cannot rock the lever 21 for the purpose of giving contact with the spring 22, and the article is automatically transferred to the category of heavy articles. If however the position of the feeler 12 after contact with the part 17 is changed into the position illustrated in Figure 3, the article is transferred into the category of light articles. On this ground in the event of the weight of the article differing from a pre-determined theoretical value by an amount smaller than that by which the sensitiveness of the scale beam is characterised, for instance 0.01 gram, or in other words if the scale beam executes no deflection, a transfer of the article into the category of heavy articles is possible in the same manner as the transfer thereof into the category of light articles, because its weight lies at the theoretical boundary between the two categories. Articles of a weight which differs from a pre-determined theoretical value by a magnitude characterising the sensitiveness of the scale beam, for instance by 0.01 gram, or by a greater value, are transferred to the corresponding category. From the point $d_1$ on the cam disc 15 onwards, the lever 11, together with the feeler 12, owing to the action of the cam $d_1$—$e_1$—$f_1$—$a_1$, can execute a return movement into the original position (Figure 1), that is, within the time in which the scale beam can already be arrested, as will be seen from the cam disc 9 in Figure 1, for the purpose of effecting, during the time of its arrest, any desired operation on the article weighed, for which purpose an impulse has been given by the lever 21.

It may be observed that the part or blade 17, as already described, is rotatable relatively to the scale beam 1, that is to say, can raise itself, as indicated in Figures 5 and 8. Such a construction of the part 17 is for the purpose, as already mentioned, of preventing the knife edge 2 from being displaced relatively to or raised out of its bearing 3 at the moment of contact of the part 17 with the feeler 12. This measure is indispensable if the sensitiveness of the scale beam 1 is to be preserved. If it is a question of no accurate weighing within the limits of the sensitiveness of the scale beam the blade 17 can be removed, and replaced by a correspondingly constructed end 17a on the scale beam 1, which end forms the part for the feeler and with which the feeler member 11b comes into contact, as illustrated in Figures 9, 10, 11 and 12. This feeler need not be rotatable in this case about a pivot such as 12a in Figure 6, but may be integral with the lever 11 forming a fork for instance with ends 11b and 11c, as shown in Figures 9 to 12. In the event of contact of the end 11b with the scale beam after passing through the angle $\alpha_0$, the end 11b, owing to the action of a spring 11a, will abut against the end 17a of the scale beam 1, as shown in Figure 10, while the lower lever 11d upon the pivot 14, will move further, as illustrated in Figure 11; for with this form of construction the lever 11 is composed of two arms 11 and 11d rockable about the pivot 14, of which the arm 11d extends upwards beyond the pivot 14, and the arm 11 is pulled by the spring 11a against this extension of the arm 11d. In this manner the spring 11a forms a flexible coupling between the arms 11 and 11d. In the event of the end 11b of the arm 11 bearing against the end 17a of the scale beam 1, the lower arm 11d, rocking further owing to the action of the cam disc 15 and of the roller 16, will stretch the spring 11a, as shown in Figure 11. In the event of the scale beam 1 being deflected out of the position AB into the position EF, the lever 11 is deflected through the entire angle $\alpha_0+\alpha$ to the right, as shown in Figure 12, and presses the lever 21 against the contact spring 22. In cases where the scale beam does not have to be protected against the influence of the indicator members, the embodiment illustrated in Figures 9 to 12 is therefore quite sufficient for giving the impulse. This form of construction can also provide sufficient exactitude, but it is to be observed that with this construction it is not possible to take such small deflections of the scale beam as can be taken with the embodiment illustrated in Figures 1 to 8, wherein indeed an extremely small deflection is taken by the point of the feeler 12, which can pass through above or below the knife edge of the part 17. In practice a deflection amounting to an angle of a few minutes or a movement of the end of the scale beam amounting to a few hundredths of a millimeter can be taken.

Figure 14:
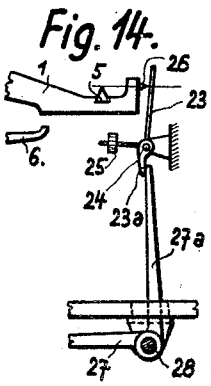
Figure 14 shows a part of the apparatus shown in Figure 13 in a different position to illustrate the release of the scale beam.

The feeling means described can only work accurately under the condition that the deflection of the scale beam immediately following the moment of release of the scale beam by the stop occurs on the right side, that is, on the side of the greater load, P or Q. Not one of the known arresting devices, all of which act in the direction of the deflections of the scale beam, can however ensure such regularity of the deflection of the scale beam, because on account of moisture, dirt or other hitherto undiscovered causes the scale beam adheres to the arresting members, and is practically never released at the two points $m$ and $n$ at exactly the same moment. Such a phenomenon can as a rule be observed in the manually controlled balances in chemical laboratories, and for this reason the first deflection is always ignored therein, and the weight of the article is judged by observing a number of successive deflections, or is noted after the scale beam has come to rest. These circumstances have the result that after releasing the arrest, the scale beam does not remain at rest, either when there is complete equality between P and Q or when there is a slight difference between them, but can oscillate to one side or the other, so that the feeler described may yield an inaccurate weighing result, and may therefore occasion an error in the action of the machine. If for instance on the left arm of the scale beam 1 in Figure 1 the load P is lighter than the load Q by 0.01 gram, the scale beam should adjust itself into the position EF. In consequence however of adhesion of the scale beam at the point $m$ to the arresting fork 6, the scale beam may swing, after release, out of the position AB into the position CD. If this incorrect deflection occurs at a time when the arc b—c of the cam disc 9 is acting upon the roller 10 it is obvious that an article, which in itself is light, may be disposed of as if it were a heavy article. The suitability of the feeler is therefore conditioned by a correct direction of the first deflection of the scale beam, which according to the present invention is attained by means of a secondary arresting device, which is illustrated in Figures 13 and 14, and which consists for example of a three-armed lever freely rotatable upon the pivot 24. The arm 23 of the three-armed lever is pressed lightly against the point of a pin 26, secured to the scale beam 1, by the influence of a weight 25. After release by the primary arresting device 6 the scale beam still remains under the influence of the three-armed lever, which, by friction of the arm 23 on the point of the pin 26, reduces the sensitiveness of the scale beam for a time, for instance for so long as the point b on the cam disc 9 is not in contact with the roller 10, so that the aforementioned adhesion at the point $m$ and $n$ by the scale beam is not perceptible, and therefore does not bring about any deflection of the scale beam at the wrong time. As soon as the arresting fork 6 assumes its lower position, indicated in Figure 14, and in Figure 1 in dotted lines, which occurs at the point b of the cam disc 9 (Figures 1 and 13), a stoppage of the secondary arresting appliance is effected, this being by the aid of a lever 27, rotatable upon a pivot 28, and resting upon the lever arm 8. An upwardly directed arm 27a of this lever strikes against a downwardly directed arm 23a of the three-armed lever (Figure 14) and rocks the same in a clockwise direction, as a result of which the arm 23 of this three-armed lever releases the pin 26, and therefore the scale beam 1 also, wherein any movement occurs with zero velocity exclusively under the influence of the loads P and Q. The moment of release of the scale beam by the secondary arresting device therefore constitutes the beginning of the weighing, that is, at the point b on the cam disc 9. The end of the weighing occurs at the moment at which the feeler 12 touches the edge of the blade 17 or travels beyond the said angle.

It is quite clear that with a sufficiently large difference between the loads P and Q, regardless of the adhesion of the scale beam at the points $m$ and $n$, the first deflection of the scale beam will always be in the right direction, and may take place even before the stoppage of the secondary arresting device. In the case of small differences between P and Q, and the adhesion phennomena at the points $m$ and $n$, the correctness of the scale beam deflection is ensured by the employment of the secondary arresting device 23 described. For a scale beam of very high sensitiveness, particularly a scale beam for weighing small doses or light articles, another embodiment of the device described is provided by the present invention, wherein the action of the feeler 12 upon the part 17 and the action of the secondary arresting device 23 upon a supporting member are opposite in direction to the action of gravity upon the scale beam 1 itself.

Figure 17:
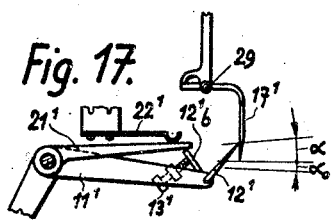
Figure 18:
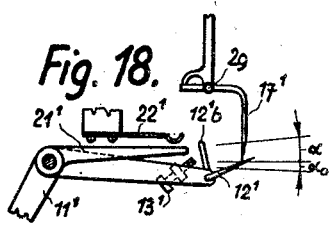
Figure 16:
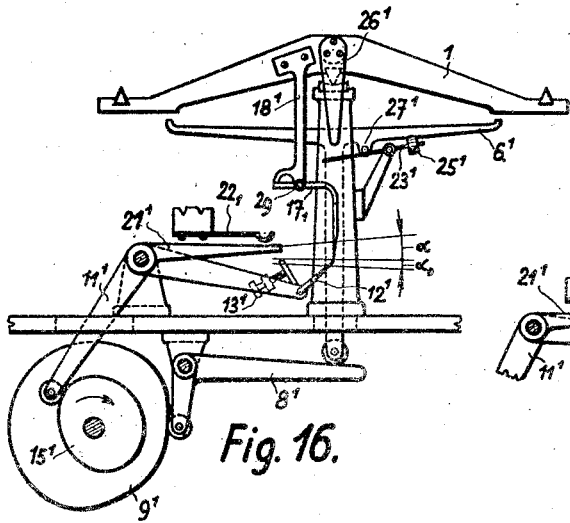
Figure 19:
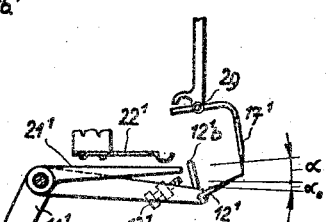

These devices, and the manner in which they co-operate, are diagrammatically illustrated in Figures 15 and 16, in which the parts serving the same purpose as those of Figures 1 and 13 are denoted by the same references, which are however distinguished by the index 1. Thus for example the part 17 of Figures 1 to 8 and 13 is denoted in Figures 15 and 16 by the reference $17^1$. The part $17^1$ of Figures 15 and 16, provided at its lower end with a knife edge, is rotatably supported upon a pivot 29 on a holder $18^1$ secured to the scale beam 1. The duty of the pin 26 of Figures 13 and 14 is here allocated, in Figures 15 and 16, to a tongue $26^1$, against the lower end of which a secondary arresting lever $23^1$ bears under the action of a weight $25^1$, and thereby damps out undesirable deflections of the scale beam, which arise at the points $m$ and $n$ upon release by the primary arresting fork $6^1$ by means of the lever $8^1$ and the cam disc $9^1$. The secondary arresting lever $23^1$ sets free the scale beam 1 owing to the fact that a pin $27^1$ secured to the fork $6^1$, when the fork $6^1$ descends, brings the lever $23^1$ from the lower end of the tongue $26^1$ into the position represented in Figure 16. The method of action of the feeler needle $12^1$, which is rotatable on a lever $11^1$ deflecting by the action of the cam disc $15^1$ in an angle $\alpha_0 + \alpha$ and maintained in its position by a screw $13^1$ for example, is completely analogous to the action of the feeler 12 of Figures 1 to 8 and 13. In Figure 17 a position is represented in which the scale beam, by the action of the loads P and Q, together with the part $17^1$, is deflected in a counterclockwise direction, so that the feeler $12^1$, upon the lever $11^1$ being deflected through the angle $\alpha_0+\alpha$, deflects freely in the same manner as in Figure 3, and acts by its end $12b^1$ upon the lever $21^1$, which touches a contact spring $22^1$ for example. Figure 18 shows a case in which the scale beam 1 is deflected in a direction opposite to that of Figure 17, so that the part $17^1$, with its lower end, places itself in the way of the feeler $12^1$, which changes its position in relation to the lever $11^1$, and does not influence the lever $21^1$ by its end $12b^1$. Finally, in Figure 19 an unstable position of the feeler $12^1$ in relation to the part $17^1$ is represented, which may change with equal probability into either of the two positions mentioned (Figures 17 and 18), and which corresponds to the positions represented in Figures 5 and 8 of the first embodiment.

The appliances described, therefore, are for the purpose of providing for accurate automatic weighing on a scale beam, for the purpose of sorting articles according to their weight, or adding material in relatively light doses, as described in U. S. Patent No. 2,198,788.

By the co-operation of scale beam 1, a secondary arresting device 23 and a needle-like feeler 12, the problem is solved of obtaining, by means of a secondary source of energy, for instance by means of an oscillating or other movement of the lever 11 together with the feeler 12, an impulse for carrying out mechanical operations which are required for the action of automatic weighing machines. The scale beam is herein exposed to no subsidiary influences during the period of the weighing, and therefore accomplishes merely its own purpose, namely the weighing, and does no work directly by its own deflection, so that the sensitiveness of the same is fully utilised. The impulse for carrying out or not carrying out a mechanical operation is given in reality by the feeler member, which determines, at a pre-determined moment after the weighing, the condition of the scale beam, that is to say the position of the scale beam at this instant, and gives or refrains from giving a mechanical impulse in dependence upon the said position.

I claim:

1. In a weighing apparatus, a pivoted scale beam, a feeler movable in a plane, a drive independent of the scale beam for moving said feeler, a release organ disposed in the path of the feeler, a contact member movable with the scale beam in the plane of movement of the feeler and engageable, in one position of said beam, by the moving feeler for preventing engagement of the feeler with the release organ, the moving feeler passing the contact member, in another position of the beam, and engaging and operating the release organ.

2. In a weighing apparatus, a pivoted scale beam, a lever movable in a plane, a feeler pivotally mounted on the lever and movable therewith, a drive independent of the scale beam for moving said lever and feeler, a release organ disposed in the path of the feeler, a contact member movable with the beam in the plane of movement of the lever and feeler and engageable, in one position of said beam, by the moving feeler for deflecting said feeler away from said organ, the moving feeler passing the contact member, in another position of the beam, and engaging and operating the release organ.

3. In a weighing apparatus, a scale beam, a movable feeler, a drive independent of the scale beam for moving said feeler, a release organ disposed in the path of the feeler, a contact member rockably mounted on the scale beam and engageable, in one position of said beam, by the moving feeler whereby the feeler is deflected away from the release organ and the contact member is displaced with relation to the said beam, the moving feeler passing the contact member, in another position of the beam, and engaging and operating the release organ.

4. In a weighing machine, a scale beam, a pivoted lever, a feeler pivotally mounted on the lever, a drive independent of the scale beam for moving said lever and feeler, a release organ disposed in the path of the feeler, a contact member rockably mounted on the scale beam and engageable, in one position of said beam, by the moving feeler whereby the feeler is deflected away from the release organ and the contact member is displaced with relation to said beam, the moving feeler passing the contact member, in another position of the beam, and engaging and operating the release organ.

5. In a weighing machine, a scale beam, a pivotally mounted feeler lever, an actuating lever, a yieldable coupling connecting the two levers, a drive independent of the scale beam for operating the actuating lever and imparting movement to the feeler lever through said yieldable coupling, a release organ disposed in the path of the feeler lever, a contact member on the scale beam engageable, in one position of said beam, by the moving feeler lever for blocking engagement of the feeler member with the release organ, the moving feeler passing the contact member, in another position of the beam, and engaging and operating the release organ.

VLADIMÍR DIMITRIJEVIČ POPOV.